(12) United States Patent
Smith (10) Patent No.: US 8,075,006 B2
(45) Date of Patent: Dec. 13, 2011

(54) THREE-WHEELED SKATEBOARD SYSTEM AND METHOD

(76) Inventor: Kevin L. Smith, Sandy, UT (US)

( * ) Notice: Subject to any disclaimer, the term of this patent is extended or adjusted under 35 U.S.C. 154(b) by 118 days.

(21) Appl. No.: 12/450,489

(22) PCT Filed: Jan. 5, 2009

(86) PCT No.: PCT/IB2009/005003
§ 371 (c)(1),
(2), (4) Date: Sep. 28, 2009

(87) PCT Pub. No.: WO2010/055372
PCT Pub. Date: May 20, 2010

(65) Prior Publication Data
US 2010/0289237 A1 Nov. 18, 2010

(51) Int. Cl.
*A63C 17/01* (2006.01)
(52) U.S. Cl. ............ 280/87.042; 280/11.27
(58) Field of Classification Search ............ 280/87.042, 280/87.041, 11.27, 11.233; 16/19
See application file for complete search history.

(56) References Cited

U.S. PATENT DOCUMENTS

| | | | | |
|---|---|---|---|---|
| D150,401 S | * | 8/1948 | Brickson | D21/765 |
| 3,252,713 A | * | 5/1966 | Heller | 280/87.042 |
| 4,060,253 A | * | 11/1977 | Oldendorf | 280/87.042 |
| 5,026,080 A | | 6/1991 | Steffl et al. | |
| 5,347,681 A | | 9/1994 | Wattron et al. | |
| 5,826,895 A | * | 10/1998 | Bradfield | 280/87.042 |
| 5,984,328 A | * | 11/1999 | Tipton | 280/87.042 |
| 6,193,249 B1 | * | 2/2001 | Buscaglia | 280/87.042 |
| 6,419,249 B1 | * | 7/2002 | Chen | 280/87.042 |
| 6,428,022 B1 | * | 8/2002 | Namiki | 280/87.042 |
| 7,080,845 B2 | | 7/2006 | Inchley | |
| 7,150,461 B2 | * | 12/2006 | Schnuckle et al. | 280/87.05 |
| 7,195,259 B2 | * | 3/2007 | Gang | 280/87.042 |
| 7,198,280 B2 | * | 4/2007 | Hara | 280/87.042 |
| 7,231,689 B2 | * | 6/2007 | Scheiber et al. | 16/19 |
| 7,243,925 B2 | * | 7/2007 | Lukoszek | 280/11.28 |
| 7,255,356 B2 | * | 8/2007 | Lin | 280/87.041 |
| 7,338,056 B2 | * | 3/2008 | Chen et al. | 280/87.042 |
| 7,353,566 B2 | * | 4/2008 | Scheiber et al. | 16/19 |
| 7,377,713 B2 | * | 5/2008 | Schaap et al. | 403/109.8 |
| 7,484,742 B2 | * | 2/2009 | Choi | 280/87.042 |
| 7,497,449 B2 | * | 3/2009 | Logger | 280/47.38 |
| 7,600,768 B2 | * | 10/2009 | Chen et al. | 280/87.042 |
| 7,766,351 B2 | * | 8/2010 | Chen et al. | 280/87.042 |
| 7,837,204 B1 | * | 11/2010 | Groenenboom | 280/11.27 |
| 7,891,680 B2 | * | 2/2011 | Chen et al. | 280/87.042 |
| 2002/0067015 A1 | * | 6/2002 | Tierney et al. | 280/87.042 |
| 2002/0195788 A1 | * | 12/2002 | Tierney et al. | 280/87.042 |
| 2006/0119062 A1 | * | 6/2006 | Lukoszek | 280/87.042 |
| 2006/0192357 A1 | * | 8/2006 | Lin | 280/87.042 |

(Continued)

FOREIGN PATENT DOCUMENTS

CN 2392573 Y 8/2000

(Continued)

*Primary Examiner* — Jeffrey J Restifo (57) ABSTRACT

A system and method for a skateboard and for propelling the skateboard. The skateboard system includes a board including a first end and a second end, the first end offset from the second end, and the second end defining a board plane. The skateboard system also includes a truck assembly attached near the first end of the board, and a caster assembly attached near the second end of the board. The caster assembly has a caster pin at an angle with respect to the board plane. Other embodiments are also disclosed.

10 Claims, 9 Drawing Sheets

| U.S. PATENT DOCUMENTS | | | | FOREIGN PATENT DOCUMENTS | | |
|---|---|---|---|---|---|---|
| 2007/0114743 A1 | 5/2007 | Chen | | CN | 2427248 Y | 4/2001 |
| 2007/0257459 A1* | 11/2007 | Gang | 280/87.042 | CN | 2917714 Y | 7/2007 |
| 2007/0284835 A1 | 12/2007 | Choi | | JP | 2003-126325 | 7/2003 |
| 2008/0296854 A1* | 12/2008 | Gates | 280/11.25 | JP | 2003-165302 | 10/2003 |
| 2009/0295111 A1* | 12/2009 | O'Rourke | 280/86.751 | JP | 2004-065709 | 4/2004 |
| 2010/0117316 A1* | 5/2010 | Weiner et al. | 280/87.042 | JP | 2004-160095 | 10/2004 |
| 2010/0117317 A1* | 5/2010 | Smith | 280/87.042 | WO | WO2007111466 A1 | 10/2007 |
| 2010/0127468 A1* | 5/2010 | Park | 280/87.042 | | | |
| 2010/0289237 A1* | 11/2010 | Smith | 280/87.042 | | | |

* cited by examiner

Fig. 7C

THREE-WHEELED SKATEBOARD SYSTEM AND METHOD

BACKGROUND OF THE INVENTION

1. Technical Field

The present invention relates in general to a system and method for a human powered vehicle. In particular, the present invention relates to a three-wheeled skateboard system and method.

2. Description of the Related Art

Figure 1:
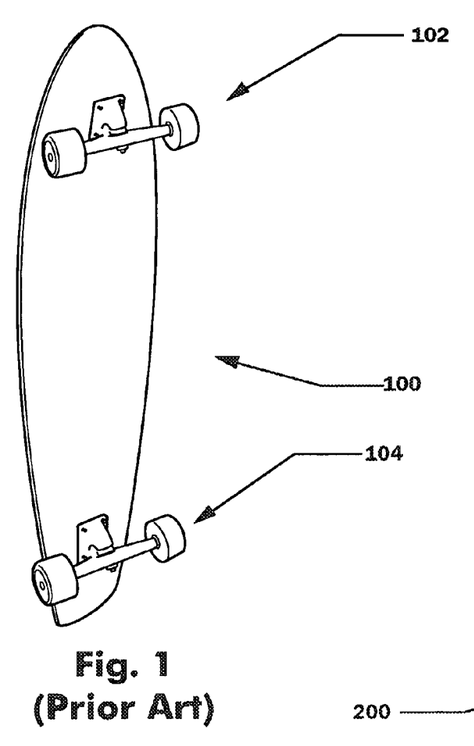
FIG. 1 is a perspective view diagram showing a general embodiment of a conventional skateboard of the prior art.

Over the years, conventional skateboards have become familiar to both children and adults. FIG. 1 is a perspective view diagram showing a general embodiment of a conventional skateboard of the prior art. Skateboard 100 includes a front truck assembly 102 and a rear truck assembly 104. As illustrated, the truck assemblies each include an axle and two wheels.

As illustrated, the conventional skateboard is constructed of an elongate board having a set of axially coupled wheels mounted beneath the board at each end of the board. In the past, this conventional design has been altered only slightly. For example, each two wheel set always included two wheels, but the sets may have been sized differently. In addition, the axle for each set may have been extended, and the elongate board may have been shaped differently to give an alternative look. Further, many aesthetic variations of the design have been implemented over time. These variations in aesthetic design have created a popular market that provides lucrative rewards to manufacturers and aesthetic designers of conventional skateboards. However, recently the conventional design of the skateboard has been modified significantly.

Figure 2:
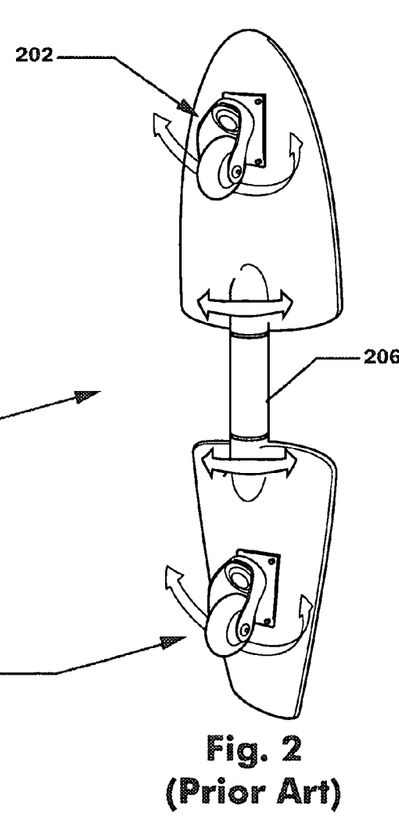
FIG. 2 is a perspective view diagram showing a general embodiment of a contemporary skateboard of the prior art.

The conventional design of the skateboard has been modified such that each set of axially mounted wheels has been removed. FIG. 2 is a perspective view diagram showing a general embodiment of a contemporary skateboard 200 of the prior art. Contemporary skateboard 200 is illustrated to show an example of the skateboard including a front footboard and caster assembly 202 and a rear footboard and caster assembly 204. These two footboard/caster assemblies are mechanically coupled by means of a connecting element 206 which is often constructed of resilient and/or flexible material.

In contemporary skateboard designs, the conventional two wheel set at each end of the elongate board has been replaced with a single caster on each of two footboards. This single caster design has greatly enhanced a rider's enjoyment on a skateboard. This latest innovation in fundamental skateboard design has been well received throughout the world. As a result of the acceptance of the contemporary skateboard design, various manufacturers have begun competing for customers. At this point, businesses compete for consumers of the contemporary skateboard, again, mostly through altering aesthetics of the contemporary two caster skateboard design.

Aside from aesthetics, consumers appear to be drawn to the contemporary skateboard, at least in part, for the unusual riding techniques that are required to operate the contemporary skateboard. Unfortunately, as users seem to ignore, these unusual riding techniques that are required to operate the contemporary style of skateboard can be detrimental to skills that are learned in analogous winter or even water sports. For example, a sport such as snow boarding appears to be similar, but does not work the same muscle sets of a rider of the contemporary skateboard. Of note, when snow is unavailable, riders sometimes ill advisedly use the contemporary skateboard as a substitute for teaching/learning snow boarding skills. Riders seem to be unaware of the detrimental effects of the contemporary skateboards and, even if aware, seem to simply ignore the problem.

Further, riders/consumers may be confused by the similar look of the contemporary skateboard to a snow board. Still further, consumers may believe that they may improve their snow boarding skills by non-snow surface training on the contemporary skateboard. However, the unusual riding technique required by the contemporary skateboard, when the athlete uses the contemporary skateboard for snow board training, could actually reduce an athlete's snow board performance. In addition, the athlete simply seeking the feel of a snow board through the use of the contemporary skateboard when off the snow surface may be disappointed when discovering such deficiencies after purchasing the contemporary style skateboard.

Unfortunately, riders/consumers have mostly ignored these problems because of the new and exciting challenge associated with the contemporary skateboard. In fact, consumers that may not be familiar with snow board or surf board techniques have turned the contemporary skateboard market into a lucrative business, thereby discouraging manufacturers from changing the fundamental design of the contemporary skateboard. In addition, experienced snow board/surf board consumers do not look to the contemporary skateboard to meet their cross-training needs, but look to the contemporary skateboard for entertainment value. Therefore, manufacturers have not seen a need to change the fundamental skateboard design and have focused mostly on improving/changing skateboard aesthetics to capture market share.

From the foregoing discussion, what is unapparently needed, therefore, is a system and method for a skateboard that provides a user with a feel that is similar to a snow or surf board. Ironically, because contemporary skateboards are often considered unsafe for stability reasons, thrill seeking consumers often seek the contemporary skateboard exactly for these instability reasons and do not seek a more stable skateboard.

Recent advancements/alternatives in skateboard technology do not address this cross training aspect. In fact, the recent advancements even teach away from addressing cross training aspects. For example, some skateboard advancements fail to even slightly appear like a snow or surf board. Further, recent advancements often lead to a decrease in skateboard stability.

For example, "Caster Skate Apparatus" US 2007/0284835 A1 (Choi) addresses problems such as an inconvenient turning radius. Choi's solution to the inconvenient turning radius leads directly to creating more instability and absolutely no cross training benefits. Still further, cross training is ignored in "Two-wheeled Skateboard" U.S. Pat. No. 5,984,328 (Tipton) where the need for in-line skateboard skating is addressed. Of note, the in-line wheels preferred in Tipton also clearly teach away from increasing stability in a conventional skateboard.

In addition, "Skateboard With Direction Caster" U.S. Pat. No. 7,195,259 (Gang) addresses the steering aspect of skateboards by disclosing techniques to improve steering of a conventional skateboard. Among other things, Gang alters the wheel arrangement of conventional skateboards by including two or even three direction casters in place of the conventional two wheel set arrangements. Of note, even with the three wheel arrangement of Gang, the wheels are constructed such that less stability is offered with the three wheel arrangement.

Among all the different types of advancements in conventional skateboard technology, aside from the failure to address cross training appeal in a skateboard, stability appears to be an advancement that has actually been avoided. Apparently, stability has been intentionally avoided due to consumer choice.

Of note, neither conventional nor contemporary skateboard designs have addressed performance adaptations by means of providing subtle adjustments to truck, hanger (axle), or wheel position dimensions. Thus, skateboard adjustments to accommodate for both environmental conditions and the sometimes significant differences between experienced and inexperienced skateboard users have been ignored.

For example, skateboard changes such as the use of a reverse kingpin truck having a reverse kingpin have been reserved for more advanced skateboard designs such as high speed long-boards. As a result, inexperienced skateboard users are unable to perform minor adjustments to these more advanced skateboards that would make the more advanced skateboard conducive to use by the inexperienced skateboard user.

In addition, key spacing in both "wheelbase," which is defined as the space between front and rear axles, and "clearance," which is defined as the space between wheel axles and deck has not been made readily adjustable in skateboards of the past. Moreover, these adjustments differ on a traditional skateboard where front and rear wheels and trucks are essentially the same dimensions. Whereas, according to principles of the three-wheeled skateboard of the present invention, as will be understood by those of ordinary skill in the art upon review of the following disclosure, the predominantly one-directional design of the past makes these adjustments far more significant.

Also of note, as will be understood by those of ordinary skill in the art upon review of the instant application, a caster pin may also be referred to herein as a "caster kingpin" and vice-versa.

In view of the prior art, the effort to improve the conventional skateboard appears to have skateboard manufacturers focused on creating a more challenging and/or aesthetically pleasing skateboard. Apparently, the practical nature of stability and/or cross training has been completely and intentionally ignored in the prior art.

SUMMARY

It has been discovered that the aforementioned shortcomings are resolved using a system for a skateboard and method for propelling the skateboard.

In one embodiment, the skateboard system includes a board including a first end and a second end. The first end is offset from the second end, and the second end defines a board plane. The skateboard system includes a truck assembly attached near the first end. The truck assembly includes a shaft substantially perpendicular with the board. The shaft connects to an axle that supports a first wheel and a second wheel. Each of the first wheel and second wheel are freely rotatable about the axle.

In addition, the skateboard system includes a caster assembly attached near the second end. The caster assembly includes a caster pin that defines an angle with respect to the board plane. The caster pin angle is an adjustable angle with respect to the board plane. Thus, the caster pin is adjustably coupled relative to the board plane such that the caster pin angle is adjustable between forming a first acute angle with respect to the board plane and a substantially perpendicular angle with respect to the board plane.

The caster assembly also includes a caster fork supporting a caster wheel that is freely rotatable about a caster axle. The caster fork translates radially about the caster pin regardless of a selected caster pin angle.

In addition, the skateboard system may include a caster assembly that is removably coupled to the board. As will be appreciated by one of ordinary skill in the art when viewing the present disclosure, the removably coupled caster assembly may be removable by means such as a simple bolt and nut arrangement, a pin assembly coupling the caster assembly to the board, or other such apparatus to create a removable coupling that avoids welding or breaking the caster assembly.

Further, the skateboard may provide an adjustably coupled caster pin that is adjustable to certain fixed angular positions according to a mating selection of matching teeth within caster assembly to secure the caster pin.

Still further, the adjustably coupled caster pin may also be adjustable via an angle pin. The angle pin can be positioned to obtain a certain fixed angular position according to an angle pin location. The angle pin location is selected within caster assembly. In either of the adjustably coupled caster pin embodiments, in operation, the caster pin has a fixed angular position that is angular with respect to the board plane.

In another embodiment, the skateboard system may include a handlebar assembly that is coupled to the board. The handlebar assembly creates a scooter embodiment that includes a skateboard that is constructed according to principles of the present invention.

In yet another embodiment, a method of propelling a skateboard constructed according to principles of the present invention includes the following steps, not necessarily in the following order.

The method includes the step of applying a lateral force to a first side of a board. The board includes a first end and a second end. The first end is offset from the second end, and the second end defines a board plane. A truck assembly is attached near the first end, with the truck assembly including a shaft substantially perpendicular with the board. The shaft connects to a truck axle supporting a first wheel and a second wheel.

Each of the first wheel and second wheel is freely rotatable about the truck axle, and a caster assembly is attached near the second end with a caster pin defining a caster pin angle with respect to the board plane. The caster pin angle forms a first acute angle with respect to the board plane, and the caster assembly includes a caster fork that supports a caster wheel freely rotatable about a caster axle. The caster fork translates radially about the caster pin.

Another step of the method of propelling a skateboard constructed according to principles of the present invention includes transferring a force through the caster assembly. In addition, the method includes applying the transferred force to a surface, wherein the applied force is the product of the transferred force and the distance between the line perpendicular to the board plane and the caster axle. In yet another step, the method includes applying a lateral force to a second side of the board based on the application of the lateral force to the first side of the board.

The method may also include adjusting the caster pin angle relative to the board plane. The caster pin angle may be adjusted by relocating an angle pin. Thus, the adjustably coupled caster pin is adjustable via alternate settings of the angle pin to obtain certain fixed angular positions.

Another skateboard embodiment includes a board as in the previously described skateboard system. However, the instant skateboard embodiment also includes a caster assembly attached near the second end with a caster pin defining an adjustable caster pin angle with respect to the board plane wherein the caster pin is adjustably coupled relative to the board plane such that the caster pin angle is adjustable between forming a first acute angle with respect to the board plane and a substantially perpendicular angle with respect to the board plane. The caster pin has a caster block and lock nut arranged to secure a caster lock plate to hold caster pin at a selected caster pin angle.

As in the previous skateboard system embodiment, the caster assembly of the instant embodiment includes a caster fork supporting a caster wheel freely rotatable about a caster axle, wherein the caster fork translates radially about the caster pin regardless of the selected caster pin angle.

The instant skateboard may also include the caster block and lock nut being configured to engage caster lock plate within caster assembly by means of mechanically threading caster lock nut onto caster lock plate in a nut and bolt arrangement such that caster lock nut may be tightened using threads of caster lock plate by rotating caster lock nut upon corresponding threads of caster lock plate.

In this embodiment, caster block provides spacing beside caster lock nut within caster assembly in a washer ring style with a teeth arrangement of caster assembly being operative to secure caster lock plate when caster lock nut is tightened. When tightened, caster lock nut and caster block secure movement of caster pin. In other words, when caster lock nut is tightened, the selected caster pin angle remains unchanged during operation.

Upon viewing the present disclosure, one of ordinary skill in the art will appreciate that variations to the above disclosed system and method could be contemplated. For example, in one embodiment, the system may include a caster assembly further including at least one shim positioned to alter the caster angle. In addition, other examples of the method may include applying a shim to the caster assembly, the shim positioned to alter the caster angle.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of examples of the invention and should not be taken to be limiting of the invention itself. Rather, any number of variations may fall within the scope of the invention, which is defined in the claims following the description.

Figure 3A:
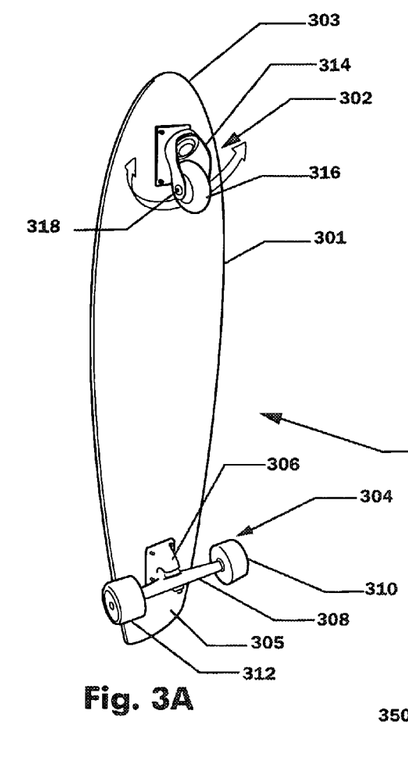
FIG. 3A is a perspective view diagram showing a general embodiment of a skateboard constructed according to principles of the present invention.

FIG. 3A is a perspective view diagram showing a general embodiment of a skateboard 300 constructed according to principles of the present invention. Skateboard 300 includes a board 301 having a front caster assembly 302, with caster fork 314, caster wheel 316, and caster axle 318, and a rear truck assembly 304, with truck mount 306, truck axle 308, first wheel 310, and second wheel 312, both assemblies being mounted on the underside of an elongate board or single deck. Advantageously, a rider of skateboard 300 does not have to leave skateboard 300 to propel the board.

In a preferred embodiment, skateboard 300 is designed such that drive is created with somewhat of a falling forward sensation that a rider may experience upon operating skateboard 300. As illustrated, and as will be described in greater detail herein, front caster assembly 302 includes a caster with a caster pin at an angle with respect to a first end 303 of the elongate board. The caster pin allows the front caster assembly 302 to freely pivot on skateboard 300. Further, unlike prior art skateboards, the combination of front caster assembly 302 and rear truck assembly 304, adjacent to second end 305 of board 301, provides an unexpectedly stable skateboard with an unexpected snow board/surf board feel.

Figure 3B:
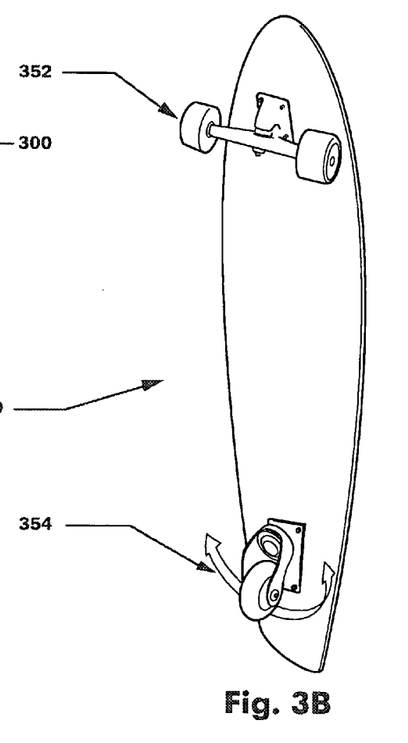
FIG. 3B is a perspective view diagram showing another embodiment of a skateboard constructed according to principles of the present invention.

FIG. 3B is a perspective view diagram showing another general skateboard embodiment, skateboard 350, constructed according to principles of the present invention. Unlike skateboard 300, skateboard 350 includes a front truck assembly 352 and a rear caster assembly 354, both assemblies being mounted on the underside of an elongate board. As illustrated and as will be described in greater detail herein, rear caster assembly 354 includes a caster at an angle that is free to pivot on skateboard 350.

Regardless of which skateboard 300, 350 is constructed, the skateboard includes a caster assembly that is mounted at an angle. Specifically, the caster mounting bolt (caster pin) is mounted at an angle and is not perpendicular or even required to be substantially perpendicular to the skateboard deck.

Figure 3C:
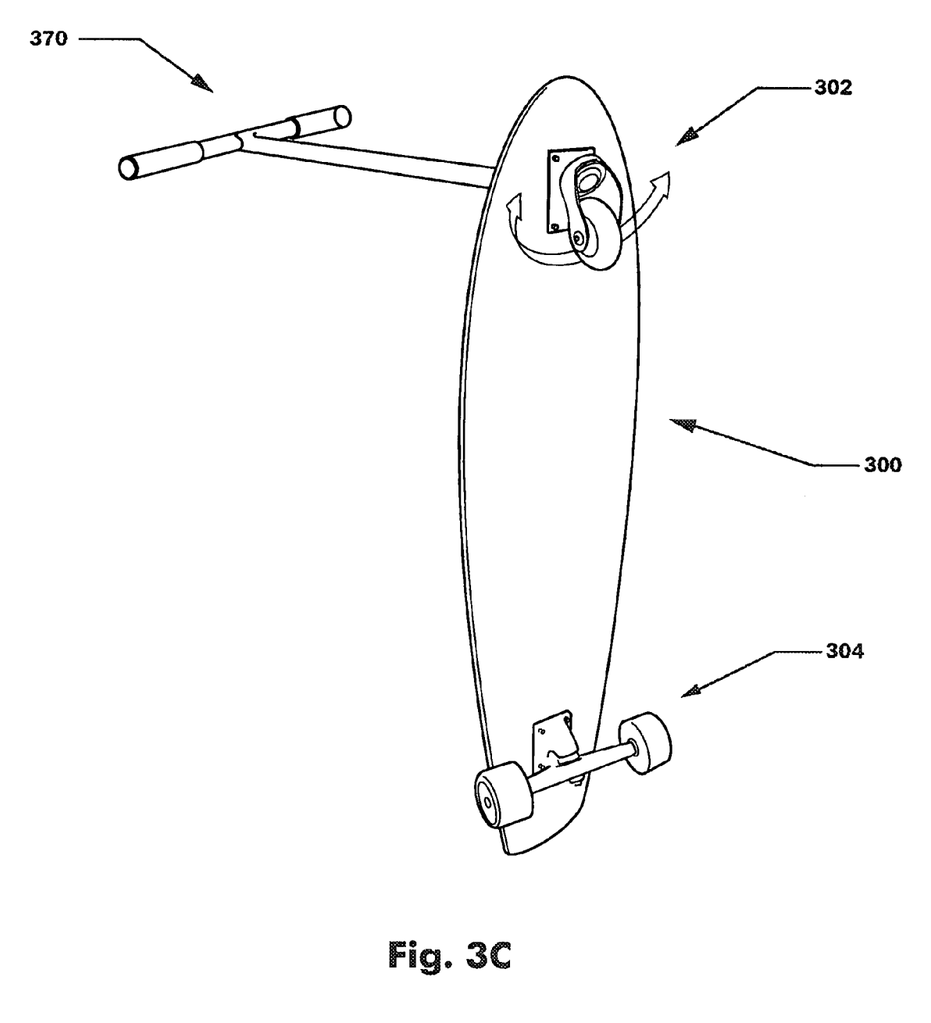
FIG. 3C is a perspective view diagram showing a scooter embodiment having a three-wheel arrangement constructed according to principles of the present invention.

FIG. 3C is a perspective view diagram showing a scooter embodiment having a three-wheel arrangement constructed according to principles of the present invention. FIG. 3C illustrates skateboard 300 constructed according to principles of the present invention, however, skateboard 300 includes a handlebar 370 to create a scooter embodiment.

As understood by those of ordinary skill in the art when viewing FIG. 3C, the illustrated scooter embodiment may be constructed with many variations. For example, as discussed with regard to FIG. 3A, skateboard 300 could simply include a front caster assembly 302 and a rear truck assembly 304, both assemblies being mounted on the underside of an elongate board or single deck. Handlebar 370 allows a rider greater stability upon operation of skateboard 300.

Figure 4A:
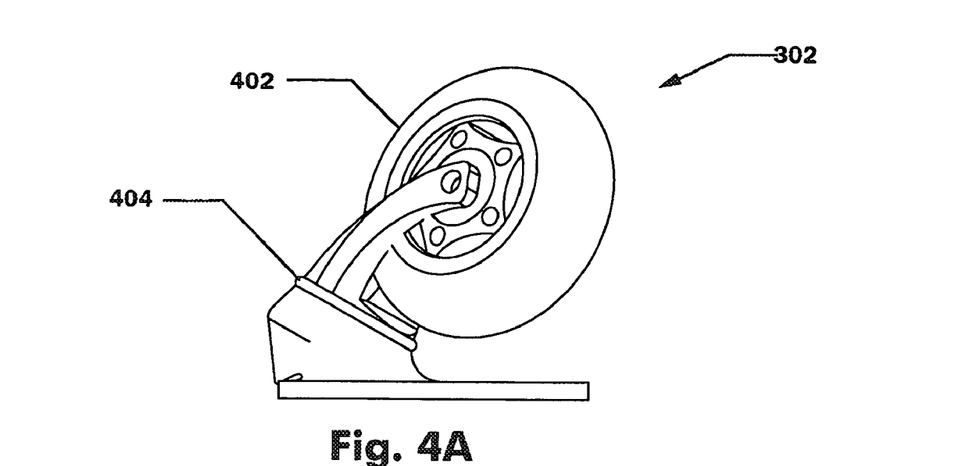
FIGS. 4A-C are perspective view diagrams showing the caster assembly of FIG. 3A moving through different positions when the skateboard of FIG. 3A operates according to principles of the present invention.
Figure 4B:
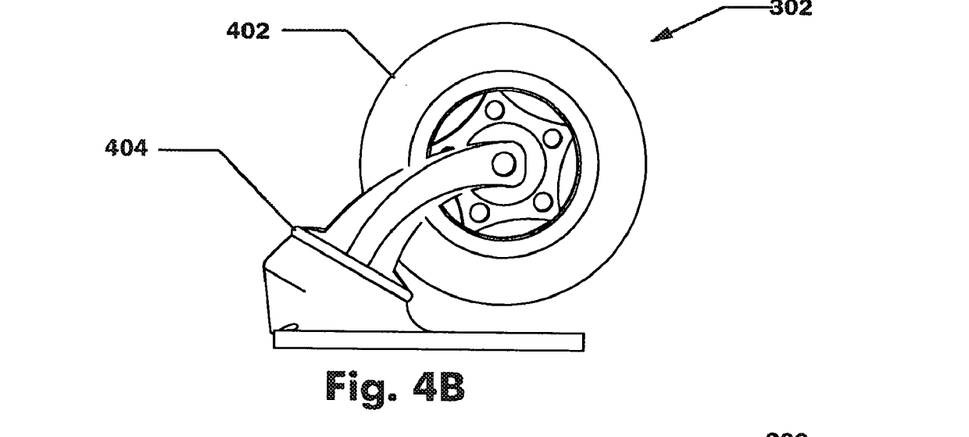
Figure 4C:
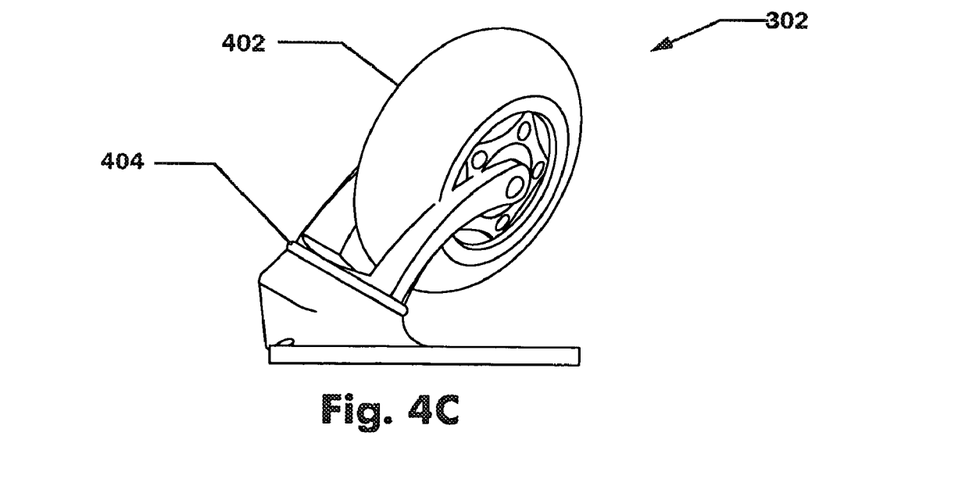

FIGS. 4A-C are perspective view diagrams showing a caster assembly embodiment that moves through different positions when the caster assembly operates according to embodiments disclosed in FIGS. 3A, 3B and 3C. Illustrated in FIGS. 4A-C is front caster assembly 302 shown in three different pivot positions. FIG. 4A illustrates caster frame and fork 404 supporting caster wheel 402 freely rotatable about a caster axle.

As illustrated in the following FIGS. 4B-4C, caster fork 404 translates radially about a caster pin, the caster pin being mounted at an angle with a board plane. Further, caster fork 404 defines a caster angle, the caster angle defining an acute angle with respect to board plane. The caster angle may further define an acute angle with respect to the caster pin.

Figure 5:
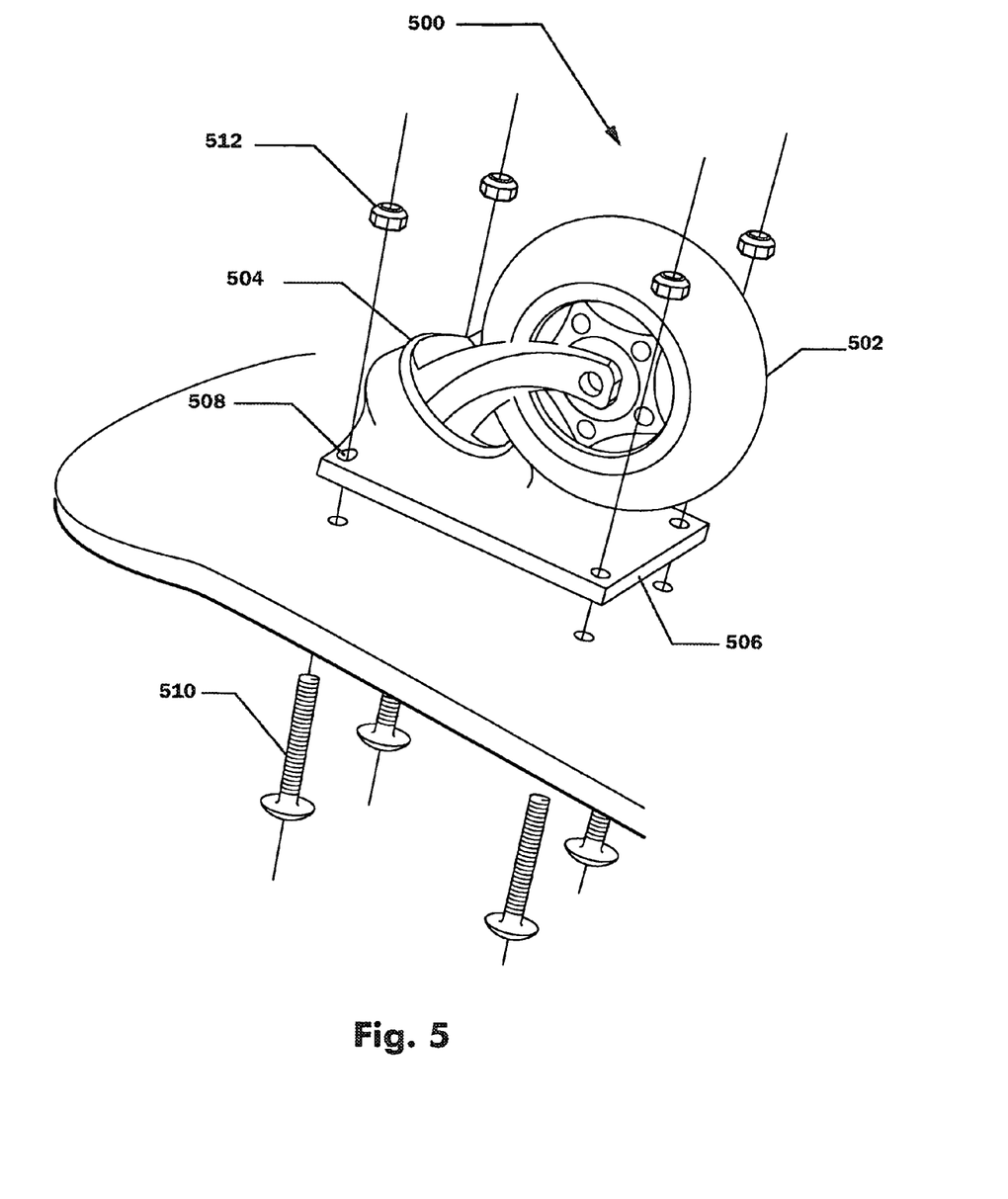
FIG. 5 is a perspective view diagram showing a removable caster assembly that operates according to principles of the present invention.

FIG. 5 is a perspective view diagram showing a removable caster assembly 500 that operates according to principles of the present invention. Removable caster assembly 500 includes, similar to front caster assembly 302, a caster wheel 502 freely rotatable about a caster axle. In addition, removable caster assembly 500 includes a caster frame and fork 504 that allows caster wheel 502 to translate radially about a caster pin. Caster fork 504 defines a caster angle, the caster angle defining an acute angle with respect to a board plane. The caster angle may further define an acute angle with respect to the caster pin. As illustrated, the caster pin is at an angle with respect to the board plane.

In addition, caster frame and fork 504 includes a base arrangement 506 for easily removing or attaching removable caster assembly 500. In the illustrated embodiment of FIG. 5, removable caster assembly 500 is shown having apertures 508 spaced about base arrangement 506. Apertures 508 are intended to receive bolts 510 which can be adapted to securely affix removable caster assembly 500 to the board plane by means of fastening nuts 512.

Upon viewing FIG. 5, it will be appreciated by those of ordinary skill in the art that other embodiments of removable caster assembly 500 such as a pin arrangement could be produced when skateboards of the invention such as skateboard 300 are studied.

Figure 6A:
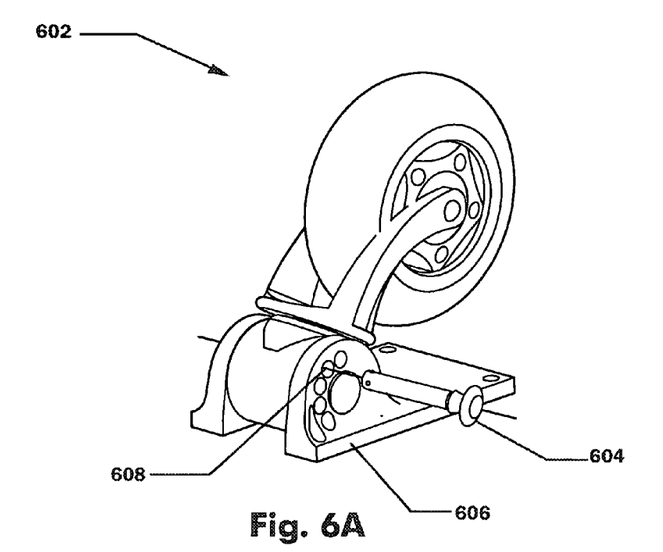
FIG. 6A is a perspective view diagram showing an adjustable caster assembly embodiment that operates according to principles of the present invention.

FIG. 6A is a perspective view diagram showing an adjustable caster assembly 602 that operates according to principles of the present invention. Like the front caster assembly 302 of FIG. 3A, adjustable caster assembly 602 includes a caster wheel with caster frame and fork. A caster angle pin 604 when engaged with a base arrangement 606 is a preferred arrangement for securing the caster frame and fork into a particular angled position. As illustrated, angle pin 604 can be inserted at aperture 608 of base arrangement 606 in order to securely select a particular caster angle position. As will be appreciated by those of ordinary skill in the art upon viewing FIG. 6A, the different apertures of base arrangement 606 allow the caster wheel to be positioned at different angles with respect to the board plane.

Figure 6B:
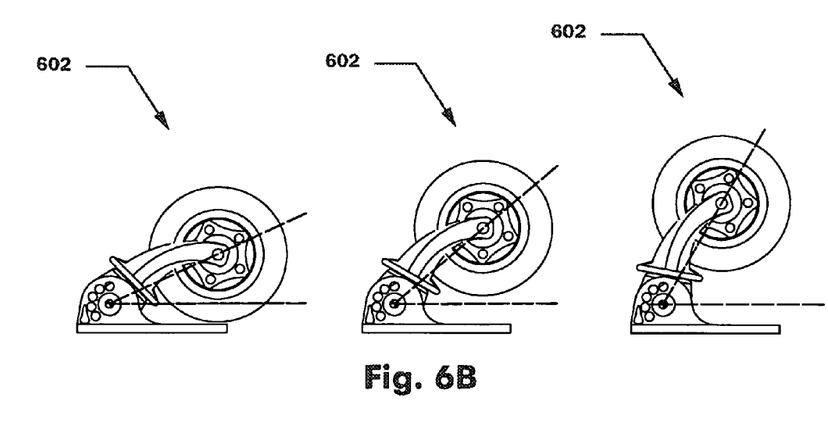
FIG. 6B is a profile view diagram showing the adjustable caster assembly embodiment of FIG. 6A when moved through different angled positions.

FIG. 6B is a profile view diagram showing adjustable caster assembly 602 when moved through different positions. Adjustable caster assembly operates according to the embodiment disclosed in FIG. 6A. Three separate positions for the caster wheel/fork are illustrated in FIG. 6B. Each position is illustrated with a separate profile image in the drawing. Of course, upon viewing the present disclosure, other angled embodiments may be illustrated as appreciated by those of ordinary skill in the art.

Figure 6C:
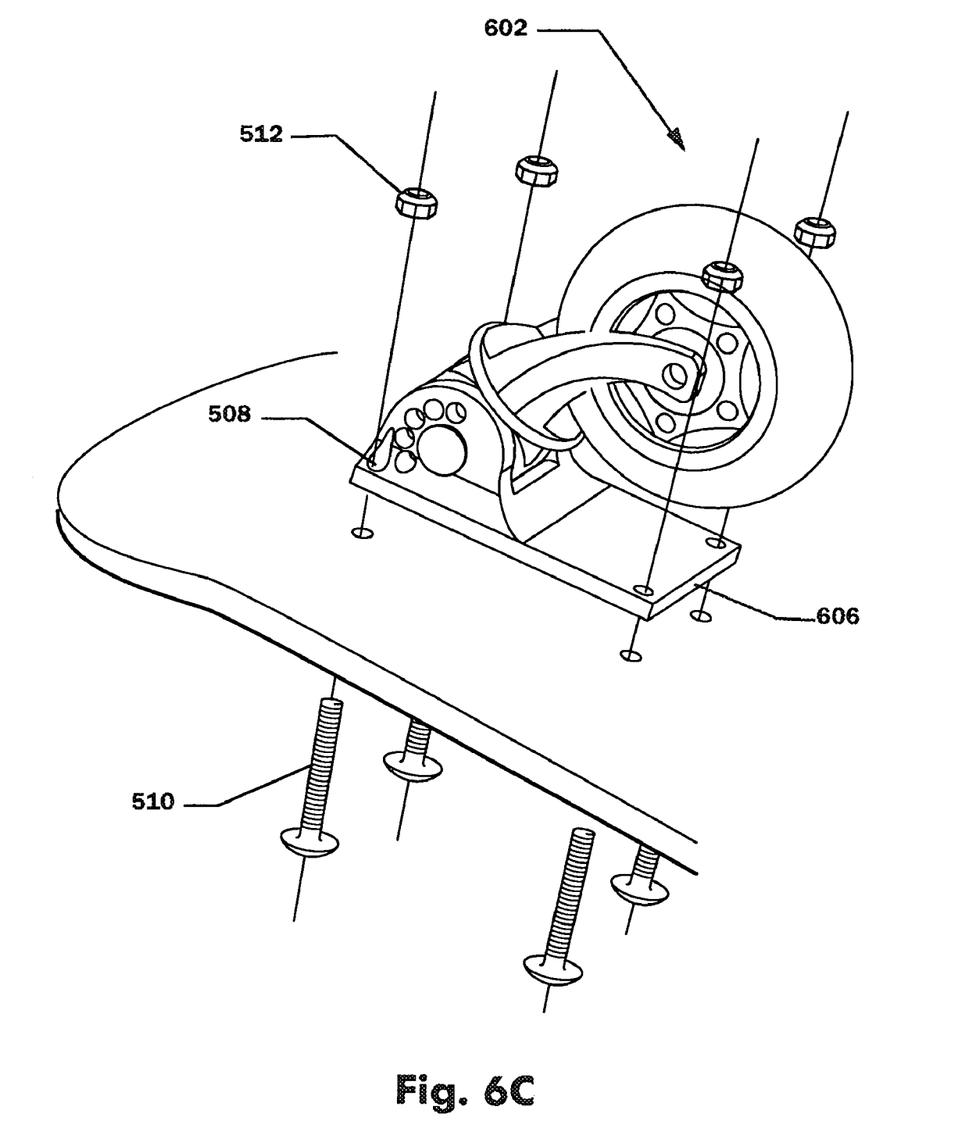
FIG. 6C is a perspective view diagram showing the adjustable caster assembly embodiment disclosed in FIG. 6A wherein the adjustable caster assembly is combined with the removable caster assembly disclosed in FIG. 5.

FIG. 6C is a perspective view diagram showing adjustable caster assembly 602 as disclosed in FIG. 6A; however, adjustable caster assembly 602 is combined with removable caster 500 disclosed in FIG. 5. Specifically, base arrangement 606 is configured to allow the presence of apertures 508 spaced about base arrangement 606 for receiving bolts 510 which can be adapted to securely affix a now easily removable adjustable caster assembly 602. Removable and adjustable caster assembly 602 is affixed to the board plane by means of fastening nuts 512. It will be appreciated by those of ordinary skill in the art upon viewing FIG. 6C that other embodiments of a removable adjustable caster assembly 602 could be produced within the scope of the present invention while yet including other aspects according to principles of the presently disclosed invention.

Figure 7A:
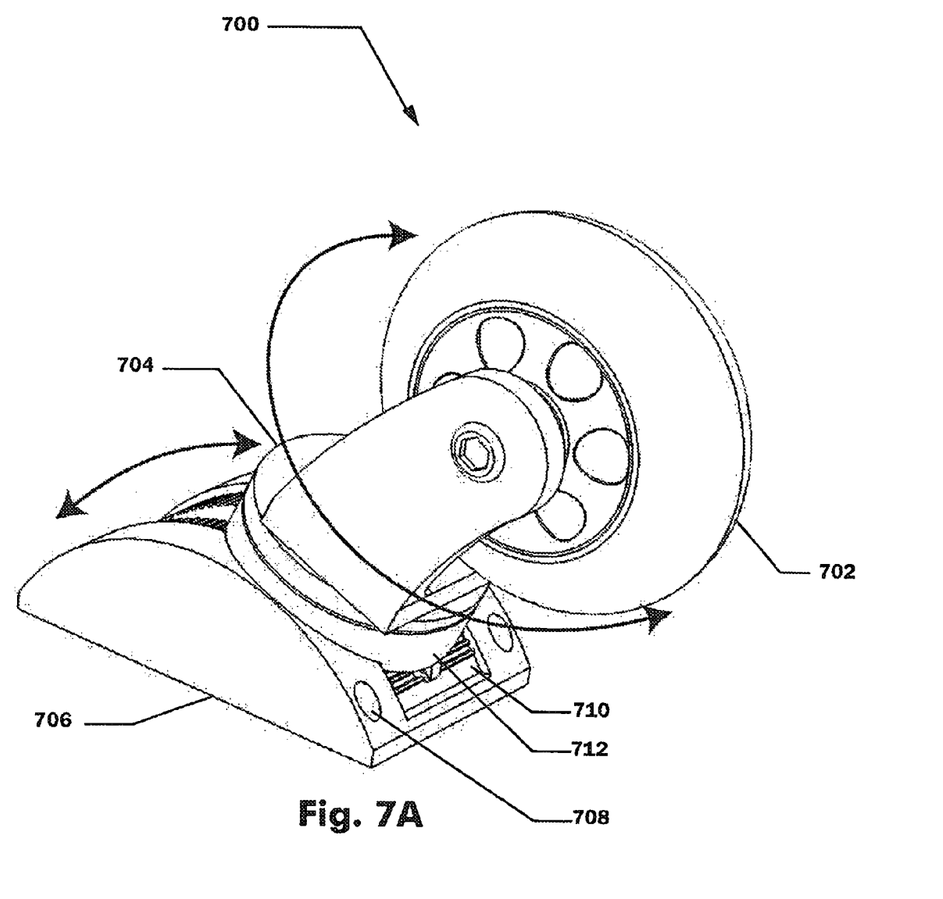
FIGS. 7A-C are perspective, profile, and cross-sectional view diagrams illustrating an alternative adjustable caster assembly embodiment when the caster assembly operates according to the embodiment disclosed in FIG. 3A.
Figure 7B:
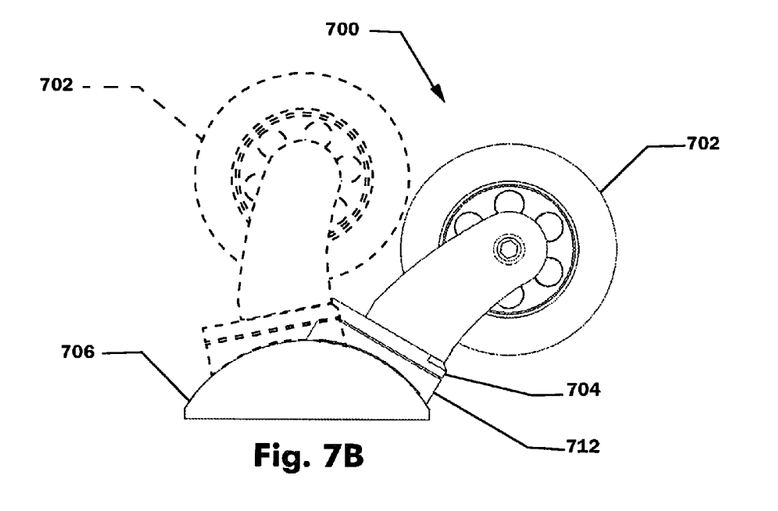
Figure 7C:
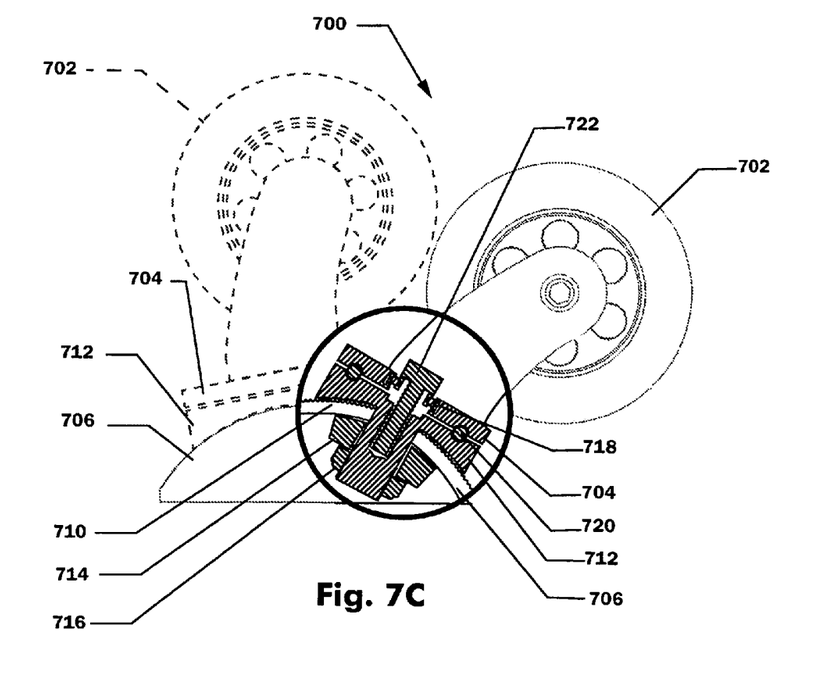

FIGS. 7A-C are perspective, profile, and cross-sectional view diagrams illustrating different views of an adjustable caster assembly 700 when the caster assembly operates according to embodiments disclosed in FIG. 3A. Adjustable caster assembly 700 includes a caster fork supporting a caster wheel 702, a caster plate 704, and a caster base arrangement 706. Caster base arrangement 706 is illustrated having apertures 708 which enable removable caster functionality. Caster base arrangement 706 is also shown having teeth 710 which enable the angle of caster assembly 700 to be securely adjustable when engaging caster lock plate 712 with caster assembly teeth 710.

In operation, as illustrated by the two-way arrows of FIG. 7A, caster plate 704 enables the caster fork with caster wheel 702 to freely pivot on an axis. In addition, engaging caster assembly teeth 710 with caster lock plate 712 enables caster wheel 702 to be securely and seamlessly adjusted relative to the board plane such that a preferred caster angle may be selected by a rider of a skateboard incorporating adjustable caster assembly 700.

FIG. 7B illustrates a profile view of adjustable caster assembly 700. The profile view shows two positions that a rider may set caster wheel 702. These two positions are shown in different line formats. One position is shown with solid lines, while a second position is shown with dashed lines; dashed lines are used in order to illustrate the second position that a rider of skateboard 300 may select for a skateboard constructed according to principles of the disclosed invention.

FIG. 7C illustrates a profile and cross-sectional view of an embodiment of an adjustability mechanism for adjustable caster assembly 700. For clarification purposes, caster base arrangement 706 is illustrated showing multiple views and hence multiple label numbering. For example, in the profile portion of the drawing, caster base arrangement 706 is illustrated and in the cross-sectional view, caster assembly teeth 710 are illustrated on caster base arrangement 706. Caster assembly teeth 710 are shown engaging with teeth of caster lock plate 712.

Also shown in FIG. 7C is a detailed cross-sectional view of caster plate 704 and related hardware for implementing an embodiment of adjustable caster assembly 700. Caster plate 704 is coupled to caster lock plate 712 by the tension of caster plate retaining bolt (aka., caster mounting bolt or caster pin) 722 threaded into said caster lock plate 712. Caster plate 704 rotates freely due to caster retaining bolt 722 engaging caster radial bearing 718 on the inner race. Outer race of caster radial bearing 718 engages the caster plate 704. Caster thrust bearing 720 suspends caster plate 704 above caster lock plate 712.

As will be appreciated by those of ordinary skill in the art when viewing caster assembly 700, caster block 714 may be secured with caster lock nut 716 to secure a caster pin angle when caster assembly 700 is configured to allow selection of a caster pin angle by a rider of skateboard 300. Further, the caster fork may attach to caster plate 704 via simple welding, manufacturing caster plate 704 having forks included as a single part, or other similar attachment method.

The included functional descriptive material is information that imparts functionality to a machine. This functional descriptive material includes, but is not limited to, mechanical gearing of an apparatus such as adjustable caster assembly 700.

While particular embodiments of the present invention have been shown and described, based upon the teachings herein, it will be appreciated by those skilled in the art that changes and modifications may be made without departing from the principles of this invention and its broader aspects. Therefore, the appended claims are to encompass within their scope all such changes and modifications as are within the true spirit and scope of this invention. Furthermore, it is to be understood that the invention is defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A skateboard comprising:
    a board including a first end and a second end, the first end offset from the second end, and the second end defining a board plane;
    a truck assembly attached near the first end, the truck assembly including a shaft substantially perpendicular with the board plane, the shaft connecting to an axle supporting a first wheel and a second wheel, each of the first wheel and second wheel being freely rotatable about the axle; and
    a caster assembly attached near the second end with a caster pin defining an adjustable caster pin angle with respect to the board plane wherein the caster pin is adjustably coupled relative to the board plane such that the predetermined caster pin angle is adjustable between forming a first acute angle with respect to the board plane and a substantially perpendicular angle with respect to the board plane, the caster assembly including a hemispherical caster base arrangement having caster assembly teeth for sliding engagement of the caster assembly, the caster assembly including a caster fork supporting a caster wheel freely rotatable about a caster axle, wherein the caster fork translates radially about the caster pin regardless of a selected caster pin angle.

2. The skateboard of claim 1 wherein the caster assembly is removably coupled to the board.

3. The skateboard of claim 2 wherein the removably coupled caster assembly is removable by means of a pin assembly coupling the caster assembly to the board.

4. The skateboard of claim 1 wherein the adjustably coupled caster pin is adjustable to certain fixed angular positions according to a mating selection of corresponding securing teeth within caster assembly, the certain fixed angular positions being angular with respect to the board plane.

5. The skateboard of claim 1 wherein the adjustably coupled caster pin is adjustable via an angle pin, the angle pin being positioned to obtain a certain fixed angular position according to an angle pin location, the angle pin location being selected within caster assembly, the certain fixed angular position being angular with respect to the board plane.

6. The skateboard of claim 1 wherein a handlebar assembly is mechanically coupled to the board.

7. A skateboard comprising:
    a board including a first end and a second end, the first end offset from the second end, and the second end defining a board plane;
    a truck assembly attached near the first end, the truck assembly including a reverse kingpin substantially perpendicular with the board plane, the reverse kingpin connecting to an axle supporting a first wheel and a second wheel, each of the first wheel and second wheel being freely rotatable about the axle; and
    a caster assembly attached near the second end with a caster kingpin defining an adjustable caster pin angle with respect to the board plane wherein the caster kingpin is adjustably coupled relative to the board plane such that the caster kingpin angle is adjustable between forming a first acute angle with respect to the board plane and a substantially perpendicular angle with respect to the board plane, the caster kingpin having a caster block and lock nut arranged to secure a caster lock plate to hold caster kingpin at a selected caster kingpin angle, the caster assembly including a hemispherical caster base arrangement having caster assembly teeth for sliding engagement of the caster assembly, the caster assembly including a caster fork supporting a caster wheel freely rotatable about a caster axle, wherein the caster fork translates radially about the caster kingpin regardless of the selected caster kingpin angle.

8. The skateboard of claim 7 wherein the caster block and lock nut are configured to engage caster lock plate within caster assembly by means of mechanically threading caster lock nut onto caster lock plate in a nut and bolt relationship such that caster lock nut may be tightened using threads of caster lock plate by rotating caster lock nut upon corresponding threads of caster lock plate, wherein caster block provides a washer ring style spacing beside caster lock nut within caster assembly, wherein a teeth arrangement of caster assembly is operative to secure caster lock plate when caster lock nut is tightened, thereby securing movement of caster kingpin when caster lock nut is tightened such that the selected caster kingpin angle remains unchanged during operation.

9. The skateboard of claim 7 wherein the truck assembly further comprises a reverse kingpin truck to attach the truck assembly near the first end of the board with the reverse kingpin.

10. The skateboard of claim 7 wherein the caster assembly attached near the second end of the board with the caster kingpin defining the predetermined caster kingpin angle with respect to the board plane comprises defining a distance between the caster axle and the board plane.

* * * * *